United States Patent [19]

Cable

[11] Patent Number: 4,684,285
[45] Date of Patent: Aug. 4, 1987

[54] RELEASABLE CONNECTOR APPARATUS

[75] Inventor: Neil Cable, Leiden, Netherlands

[73] Assignee: Agence Spatiale Europeenne, France

[21] Appl. No.: 820,368

[22] Filed: Jan. 21, 1986

[30] Foreign Application Priority Data

Jan. 31, 1985 [FR] France .................................. 85 01353

[51] Int. Cl.⁴ .................................................. F16B 1/00
[52] U.S. Cl. ...................................... 403/331; 403/333;
403/316; 403/327; 403/407.1; 52/594
[58] Field of Search ............ 403/330, 331, 381, 407.1,
403/287, 316, 333, 334, 327; 52/72 C, 594;
5/300

[56] References Cited

U.S. PATENT DOCUMENTS

| 969,307 | 9/1910 | Sumerlin | 403/330 X |
|---|---|---|---|
| 1,055,392 | 3/1913 | Fox | 5/300 |
| 1,807,646 | 6/1931 | Wright | 403/331 |
| 2,107,238 | 2/1938 | Des Roches | 403/331 |
| 2,774,609 | 12/1956 | Winger | 403/381 X |
| 2,994,888 | 8/1961 | Minuti | 403/407.1 X |
| 3,589,758 | 6/1971 | King | 403/407.1 X |
| 3,737,117 | 6/1973 | Belew . | |
| 4,019,298 | 4/1977 | Johnson, IV | 403/331 |
| 4,477,082 | 10/1984 | McKenzie et al. | 403/381 X |

FOREIGN PATENT DOCUMENTS

| 1123172 | 9/1956 | France . | |
|---|---|---|---|
| 1332113 | 6/1963 | France | 403/381 |
| 98330 | 3/1921 | Switzerland . | |
| 3677 | of 1818 | United Kingdom | 5/300 |
| 13737 | of 1901 | United Kingdom | 403/381 |
| 2118075 | 4/1983 | United Kingdom . | |

Primary Examiner—Cornelius J. Husar
Assistant Examiner—Todd G. Williams
Attorney, Agent, or Firm—Parkhurst & Oliff

[57] ABSTRACT

The invention provides a releasable connector comprising a male part presenting four mutually inclined faces forming a tetrahedral wedge, and a female part presenting three walls for mating with the faces of the male part when the male part is inserted therein. A locking device is mounted on one of the two parts and applies a locking force, urging the wedge into intimate contact with the female part to lock the male part in position. The locking means is movable to a release position in which it frees the male part for insertion and withdrawal in a direction transverse to the face. The mutual inclinations of the three faces are sufficient to avoid jamming of the connector.

14 Claims, 5 Drawing Figures

RELEASABLE CONNECTOR APPARATUS

BACKGROUND OF THE INVENTION

This invention relates to connector apparatus which enables precision location of two parts relative to each other by the action of a single locking force, and is releasable to allow immediate impedance-free separation of the parts when the locking force is removed.

Among the most common problems encountered in engineering are the fixing of an item in a desired position and the release of a fixed item when it must be moved.

The joints needed for these tasks must have specific properties, but frequently the designs used possess awkward characteristics which can only be overcome by means of human dexterity and ingenuity at the time of fixing or release. This indicates that some of the properties of the joints are not those required.

By the use of appropriate measures the basic requirement that the item is under control at all times can be met while the need for human intervention, which is only a product of the design, can be reduced or eliminated.

With the trend towards automation the joining and separation must be achieved entirely under the action of machinery. A system providing only the required properties, which is simple and reliable, is thus essential.

The major disadvantage of many existing designs is that they employ mechanisms which fail to create the correct conditions at the fixing or release of the object and which interfere when control must be transferred from one to the other. They possess properties which are not only unnecessary but which impede or prevent the desired operation. Additional mechanisms have to be provided to compensate for the incorrect fixing and the unwanted interaction, requiring extra features to provide compliance.

Many designs use pins or rails for guidance, but this introduces surfaces parallel to the direction of movement with the friction problems this entails due to the sliding which must occur between the components of the joint. Where high lateral positioning accuracy is needed with separability, there is a conflict between the two functions: for the positioning the clearances between pin and hole need to be very small, but for separation they need to be large to allow the passage of one relative to the other.

Where the joint location and load carrying parts are not the same, then there is a conflict between them which leads to loss of the required control during joining or separation, or to the need for additional components to deal with the problem.

Those designs using narrow conical tapered interfaces have potential problems with jamming, as they require close tolerances to achieve correct positioning and need additional locking sleeves and rotational constraints, which are themselves the source of more problems.

Many designs have locks which require complex motions to perform their tasks, and use locking systems which often interfere with the function of joining or separation.

Locking surfaces perpendicular to the direction of movement are often used, introducing friction problems to the locking and release operation. Here, also, tolerance requirements conflict between the positional and movement needs.

The choice of assembly direction is frequently prescribed by the design of the joint used, thus limiting the application of that particular design.

U.S. patent application Ser. No. 371,353 (Moses J.LONG/NASA) filed Apr. 23, 1982 and now abandoned describes a connector comprising male and female parts whose interfaces comprise a conical part and a separate sleeve for immobilizing the parts along the cone axis. Precise alignment of the sliding surface of the sleeve, between the male and female parts requires very tight tolerances for the cones ; when the two parts are correctly and tightly assembled, their separation can be difficult or impossible due to the risk of jamming. The parts wear inevitably and the connector becomes unusable relatively rapidly.

OBJECTS OF THE INVENTION

An object of the invention is to provide a simple re-usable connector apparatus giving precision location and instant release.

Another object of the invention is to provide a reliable and durable connector apparatus.

Another object of the invention is to provide connector apparatus whose assembly and release are simple.

An object of an embodiment of the invention is to provide connector apparatus whose assembly and release may be achieved by one-handed manual manipulation.

An object of another embodiment of the invention is to provide connector apparatus for assembly and release by automated or robotized apparatus.

SUMMARY OF THE INVENTION

The present invention provides a releasable connector apparatus comprising a male part, said male part comprising first, second and third mutually tetrahedrally inclined faces, a female part into which said male part may be inserted by relative translation movement in an insertion direction, said female part presenting first, second and third walls which are mutually inclined and spaced in a manner similar to that of said faces, whereby to mate with said first, second and third faces of said male part, said male part being withdrawable from said female part by relative translation movement in a withdrawal direction generally opposite to said insertion direction, and releasable locking means mounted for movement to a locking position in which it applies a locking force opposing movement of said male part in said withdrawal direction and urges said walls and faces into intimate contact, and said locking means being mounted for movement to a release position in which it frees said male part for withdrawal from said female part in said withdrawal direction, the mutual inclinations of said first, second and third faces being sufficient to avoid said male part jamming inside said female part when said locking means is released.

The three mating walls and faces are sufficient to locate the male part in place, the locking means immobilizing the parts in the precise located relationship. Engagement of a maximum of four faces on the male part is sufficient to provide all necessary constraint.

The walls and faces may be planar, or nonplanar. Their contact zone may be substantially point contacts. The apparatus may be of simple construction and simple functioning, both for assembly and withdrawal.

The apparatus ensures a remarkably precise relative location of the male and female parts. The sloping walls of the female part guide the male part to the correct positioning during assembly, and do not hinder separation of the parts. Connection is ensured even under severe external loads and vibration. The guidance during assembly ensures quick and ready connection at exactly the desired moment.

Operation of the apparatus needs only small forces. All sliding between the male and female parts may be avoided. Sloping guidance to the connected position and the increasing clearances during separation limit the resistance to insertion and withdrawal. The locking means does not have to participate in insertion of the male part, since it is actuated when the male part is fully inserted. All loads reduce to zero at the moment of unlocking.

The apparatus is convenient to use. It can be used in several different chosen directions relative to external loads. Assembly can occur in a direction axially or laterally of the members to be joined, and its operation is even possible in difficult environments, as discussed above, for example. The apparatus may be designed for manual or automatic actuation, and is readily adapted for single-handed actuation.

The apparatus provides great security of operation. The assembly is locked in each direction for each of the six degrees of freedom. The operation is fully internally controlled. The apparatus does not require sharp edges to function, and it can be made safe for handling by rounding all edges. It can be arranged to fail-safe to the locked position under vibration.

The faces of the male part and the locking means may be disposed at wide separations, if desired.

The connector itself carries the loads, which may be of high magnitude.

DESCRIPTION OF THE DRAWINGS

Other features and advantages of the invention will appear from the following description, given by way of example, with reference to the accompanying drawings, in which.

DESCRIPTION OF THE EMBODIMENT OF THE INVENTION

For a better understanding of the qualities of a connector and the particular advantages of the embodiments of the invention illustrated, the essential principles of the connectors will first be described with reference to FIG. 1 of the drawings.

For an object to be adequately fixed in space it must be constrained in both senses of each of the six degrees of freedom.

The fixing must be achieved by the action of a set of forces, moments and reactions, which maintain the item in equilibrium.

If the item is to be moved from this fixed location these must all reduce to zero to aallow movement in the required direction and also to avoid any residual forces or moments causing unwanted motion or resistance to the desired motion.

The simultaneous control of a set of forces and moments could be problematical but the present invention provides a solution.

The invention makes use of the face that forces can be resolved into components along other chosen directions, and that moments can be replaced by forces and moments in other chosen senses.

For complete translational constraint, it can be seen that only four coincident forces are needed if these resolve into components along all the major axes. Similarly, only four moments are needed for full rotational constraint.

Figure 1:
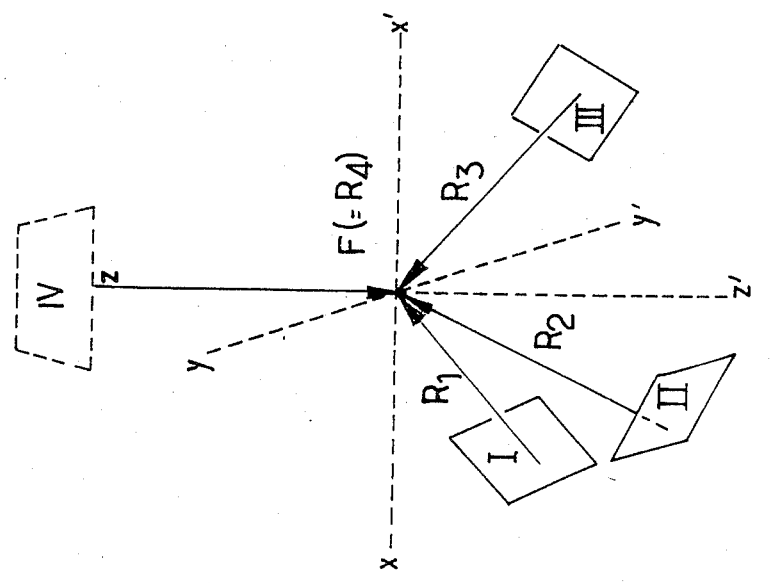
FIG. 1 is a diagram showing schematically the location and locking faces of a connector apparatus in accordance with the invention.

Suitable reaction forces are shown in FIG. 1 at $R_1$, $R_2$, $R_3$ and $F=R_4$ which are mutually inclined and converge on a common point. These forces can resolved into components along the major axes $x,x'$; $y,y'$; $z,z'$.

The constraints may be active, such as an applied force or moment, or passive, such as the reaction provided by a mechanical stop.

In one embodiment of the invention, three of these forces and moments are each provided by reaction from respective places I, II, III, which are mutually inclined at suitable substantial angles and it can be seen that the set of necessary constraints can be completed by the single force F in a contrary direction and the reactions $R_1$, $R_2$, $R_3$ from three planes, I, II, III.

The removal of the force F allows movement instantly in the direction opposite to that force.

The force F may itself be applied by means of a reaction $R_4$ from another suitably angled plane.

For ease of understanding, the planes may be thought of as the fces of a truncated tetrahedron (see FIG. 2) and the principle of the connector as being a truncated-tetrahedral wedge.

All the necessary constraint is provided by reaction in static members with the sole exception of the locking force which has to be applied. This means that locking and releasing the joint is accomplished by the control of one single force.

Figure 2:
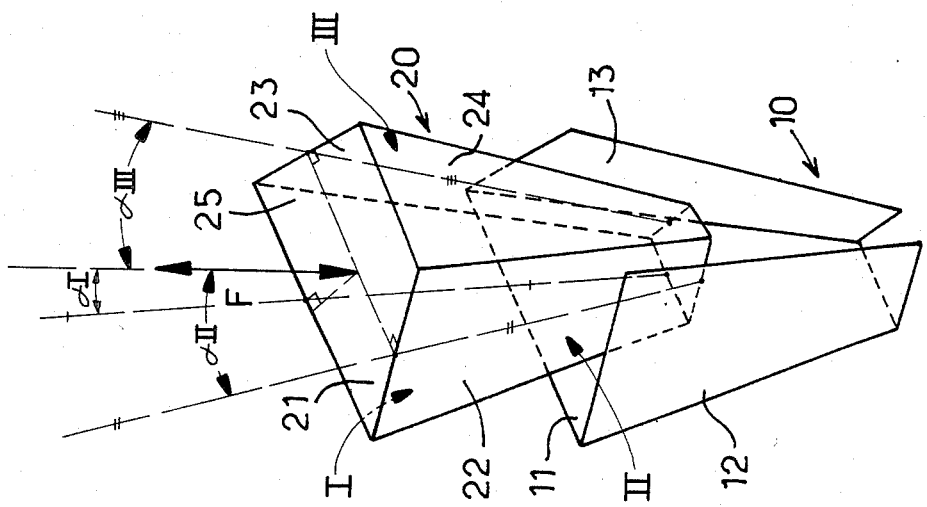
FIG. 2 is a schematic perspective view of part of a connector apparatus in accordance with an embodiment of the invention.

As shown in FIG. 2, a preferred form of the truncated-tetrahedral wedge comprises two parts: a male part 20 providing the truncated-tetrahedral shape in convex form, and a female part 10 having within it a space of the required shape to mate with the male half.

As shown in FIG. 2, in this embodiment, the female part 10 comprises a rear wall 11 from which project two side walls 12 and 13, the walls 11, 12 and 13 being mutually inclined. The male part 20 presents a complementary truncated-tetrahedral convex shape defined by a rear face 21 and two side faces 22 and 23 which mate with the walls 11, 12 and 13 respectively, the bottom and front points of the tetrahedron being truncated with a flat 24 forming a front non-mating face. The fifth face 24 is provided solely to limit the bulkiness of the male part, by removing the non-active part of the tretrahedron which originally extended in prolongation of faces 22 and 23 (FIG. 2). The male part 20 also presents a top face 25 being the fourth face of the truncated-tetrahedron, which is inclined to the faces 21, 22 and 23, and to which a locking force F may be applied to the assembled male part 20 to retain it in position in the female part 10.

In the embodiment shown in FIG. 2, the walls 11, 12 and 13 and the faces 21, 22 and 23 present extensive mating planar surfaces, suitably sized and angled. However, the contact surfaces may be reduced substantially to point contact, if desired, provided that the resultant reactions are in the correct place and direction.

The planes may be positioned as needed, so the complete interface can be made to fit the available volume, and may be relatively remote from each other.

The angles must be chosen to be greater than the angle of friction, to prevent jamming, and to be less than that which would allow lateral movement under the action of externally applied loads.

In order to avoid jamming, the smallest of the angles between the force F and each of the planes I, II, III, must all be greater than the angle of friction. The smallest angle between the force F and each of the planes I, II, and II is the angle between the direction of the force, and the orthgonal projection of said direction on each of the planes (I, II, III). These angles are labeled $\alpha_I$, $\alpha_{II}$, and $\alpha_{III}$ respectively in FIG. 2. In a particular case, the angle of friction is 5°. Moreover, these angles must not be so large as to admit lateral relative movement of the parts 10 and 20 under lateral loading: preferably each angle is less than 45°. In a preferred embodiment each angle is between 15° and 20°.

The joint is made by introducing the male part 20 into the female part 10. The required position is achieved when all the contact points are in the correct relationship, and the required strength is reached when the appropriate locking force F is applied.

Figure 3:
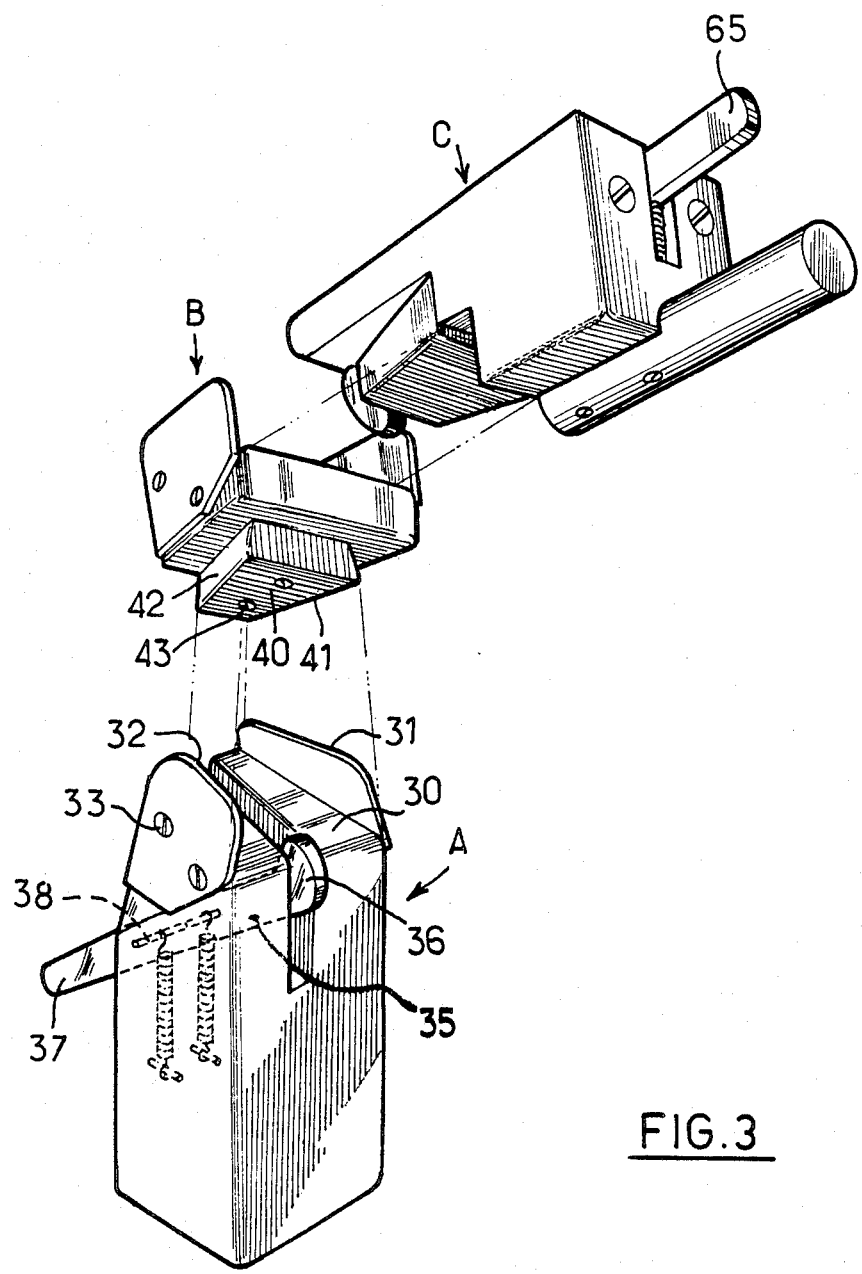
FIG. 3 is a perspective view of connector apparatus in accordance with an embodiment of the invention, including two versions of joint.

A prototype apparatus is shown in FIG. 3 and illustrates two versions of a connector apparatus of the above kind. The prototype comprises three parts A, B and C. Part B may be connected to parts A and C. This prototype illustrates an application to robotised manipulation, in which the part B may be transferred from one manipulator arm to another, the arms being represented by parts A and C.

The connector between parts A and B comprises a female truncated tetrahedral wedge on part A formed by walls 30, 31 and 32. Wall 30 comprises a front face of part A with tapering sides, and walls 31 and 32 are formed by side checks 31 and 32 secured to the body of the part A by screws 33, for example. The male wedge is formed on part B and comprises a truncated tetrahedron presenting faces 40, 41 and 42 for mating with the walls 30, 31 and 32. The wedge is secured to the body of the part B by screws 43, for example.

The connector is assembled when the male wedge is inserted inside the female wedge and retained in place by a locking finger 35.

The locking finger 35 comprises a shaft portion extending between a hook 36 and a control lever 37 for actuating the finger. The shaft portion is mounted pivoting on an axis 38 adjacent the female wedge under the face 30 in the body of the part A. The locking finger is pivotable between two positions:

a release position in which the hook 36 is disengaged from the male wedge and the finger is withdrawn from the female wedge and the path of entry and withdrawal of the male wedge, and a locking position so as to apply a force F of suitable magnitude by the engagement of the hook against the fourth side of the male truncated tetrahedron in a suitable direction.

For manufacturing convenience in the embodiment shown, the locking finger 36 is hinged on the axis 38; it is spring biased towards the locking position, although it could be biased towards the release position, if desired.

It will be appreciated that, in this first version of the connector, the locking finger 36 is mounted on the part A which comprises the female wedge. In the second version, connecting parts B and C, a locking finger 65, similar to the finger 35 on part A, is mounted on the part C which comprises the male wedge. The second version of the connector is otherwise generally symmetrical with the first version.

The load capacity of the joint is a direct function of the locking force and the strength of the components of the joint parts.

The locking force is preferably applied by a lever, as shown in the drawings, so that the actuation or relese force is small by comparison with the required reaction to the applied load, but, by the choice of angle used for the latching face, such that no back-driving is possible.

When the locking force is removed, all reactions reduce to zero with the object still in position but free to move in the direction opposite to that of the force.

Figure 5:
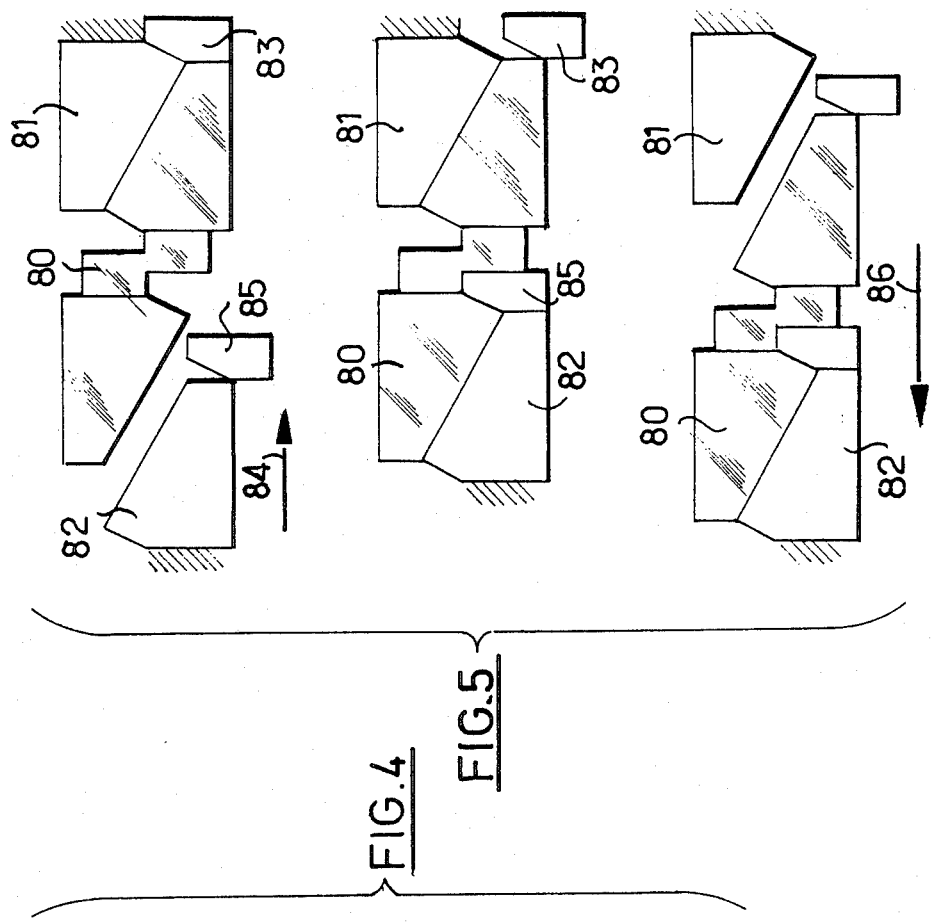
FIGS. 4 and 5 are schematic side views of connector apparatus in accordance with further embodiment of the invention in preferred applications thereof.
Figure 4:
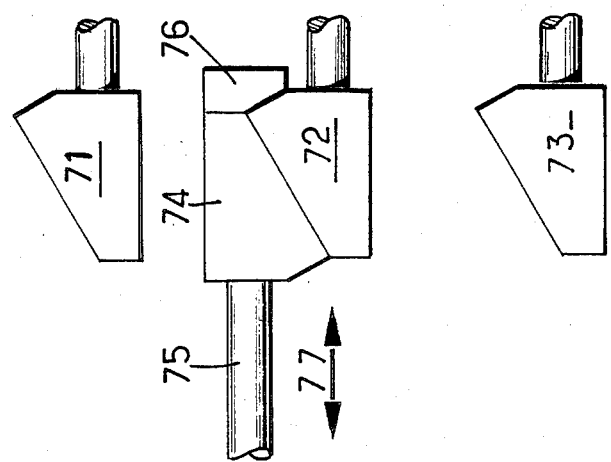

FIGS. 4 and 5 illustrate applications of a releasable connector in accordance with an embodiment of the invention.

The invention can be used in any size ranging for example, from the fixing of small objects in an experiment facility to the location and locking of in-orbit structures, by the choice of suitable sizes and strengths of the parts.

FIG. 4 shows schematically a connector used in robotised manipulation of end effectors 71, 72 and 73. The effectors each have a respective connector wedge, in this example a female wedge, and a male connector wedge 74 is mounted at the end of a manipulator arm 75, the male wedge 74 comprising a locking finger 76. When the two parts 72, 74 are connected and locked by the finger 76, the effector 72 may be moved in or out in the direction indicated by the arrow 77, parallel to the locking force.

FIG. 5 shows schematically the use of connectors in accordance with the invention for manipulation of an object in an automated, robotized application and specifically for the transfer of an object 80 from a fixed member 81, for example a storage position, to a second member 82, using two connectors in series. FIG. 5 shows three stages. In the first stage, the object 80 is secured to the fixed member 81 by a truncated tetrahedral wedge connector comprising male and female parts on the respective members 80, 81 and a locking finger 83. The members 80, 82 present respective male and female parts of a truncated tetrahedral wedge end effector and a locking finger 85, and the free member 82 is advanced towards the member 80 in the direction to engage the end effector connector in the direction indicated by the arrow 84, the locking finger 85 being in the release position.

In the second state, the end effector wedge connector is engaged and locked to connect the members 80 and 82, and the locking finger 83 of the first connector is then released so that the object 80 is removable from the member 81. This unlocking operation is facilitated by the fact that the object 80 is already completely connected to and controlled by the free member 82.

In the third step, the member 82, loaded with the object 80, is withdrawn from the member 81 in the direction opposite to the previous locking force of the finger 83, as indicated by the arrow 86.

It will be appreciated that in these manipulations, the object is under full control at all times, and this applies to the transport phase in particular. This is achieved by ensuring that the object is firmly fixed to the medium used to move it, albeit only temporarily, in order to maintain the required control during the transport phase. The release from the first medium must be complete to allow movement in the required direction, but can only be allowed to occur when the fixing to the second has been accomplished. While either of the two fixed situations may easily be established and controlled, even with prior art connectors, it is the transition beween them which can be the cause of severe problems if not provided for in advance.

Embodiments of the invention may be used in a wide variety of earth-bound or orbital-applications, for example:

sample storage and exchange in an experiment facility;

as an end effector for a robot manipulator;

as an interface for exchangeable end effectors on a robot manipulator;

as a boom, antenna or solar array hold-down, release and relatching mechanism;

as a clutch mechanism;

as the structural parts of an electrical or fluid connector;

automatic or manual handling or fixing of objects, and the linking of structure parts.

I claim:

1. Releasable connector apparatus comprising:

a male part, said male part comprising a wedge member having a truncated tetrahedron shape, said male part comprising first, second, third and fourth faces, said faces being inclined and converging toward a single point defined by an imaginary apex of the truncated tetrahedron;

a female part into which said male part may be inserted and withdrawn by relative translation along an insertion line of direction, said female part comprising first, second and third walls which are inclined and spaced so as to mate with the first, second and third faces, respectively, of the male part when said male part is inserted into said female part;

releasable locking means mounted for movement between a locking position and a release position;

wherein when said male part is inserted in said female part and said locking means is in said locking position, said locking means applies a locking force to said fourth face to oppose withdrawal of said male part and to urge the faces of the male part into intimate contact with the walls of the female part;

and wherein when said male part is inserted in said female part and said locking means is in said release position said male part is free for withdrawal from said female part.

2. Releasable connector apparatus according to claim 1, wherein at least one of said faces of said male part makes substantially point contact with a corresponding wall of said female part when said male part is inserted into intimate engagement with said female part.

3. Releasable connector apparatus according to claim 1, wherein the angle of inclination of each of said first, second, and third walls is an acute angle.

4. Releasable connector apparatus according to claim 1, wherein said male part comprises a further member to which said wedge member is secured, said female part comprises a body portion defining said first wall and projecting portions disposed at opposite sides of said first wall and defining said second and third walls.

5. A structure comprising a plurality of structural members and a plurality of releasable connector apparatus as claimed in claim 1 connecting said structural members.

6. Apparatus comprising an object, a fixed member and a movable member defining first and second connector apparatus as claimed in claim 1 for connecting said object with said fixed and movable members respectively, said first and second connector apparatus being simultaneously actuatable to connect said object simultaneously with said fixed and movable members, and said locking means being subsequently separately actuatable whereby to withdraw said movable member either with said object connected thereto or without said object which is left connected to said fixed member.

7. Releasable connector apparatus according to claim 1, wherein said first, second and third walls are each inclined with respect to the insertion line of direction at an angle of inclination which is greater than 5°.

8. Releasable connector apparatus according to claim 7, wherein said angles of inclination are each less than 45°.

9. Releasable connector apparatus according to claim 7, wherein said angles of inclination are each substantially between 15° and 20°.

10. Releasable connector apparatus according to claim 1, wherein said locking means engages said fourth face in said locking position and disengages from said fourth face in said release position.

11. Releasable connector apparatus according to claim 10, wherein said locking means comprises a locking member mounted on said female part for movement between said locking position in which it engages said fourth face and said release position in which it frees said fourth face.

12. Releasable connector apparatus according to claim 1, wherein said locking means comprises a locking member mounted on one of said male and female parts for movement between said locking position in which it engages the other of said male and female parts and said release position in which it frees the other of said parts.

13. Releasable connector apparatus according to claim 12, wherein said locking member is mounted pivotal on said part and terminates in a hook portion for engaging the other of said parts.

14. Releasable connector apparatus according to claim 12, wherein said locking means includes spring bias means for biasing said locking member towards said locking position and developing said locking force.

* * * * *